No. 894,074. PATENTED JULY 21, 1908.
W. N. SNOW.
VEHICLE.
APPLICATION FILED JUNE 15, 1907.
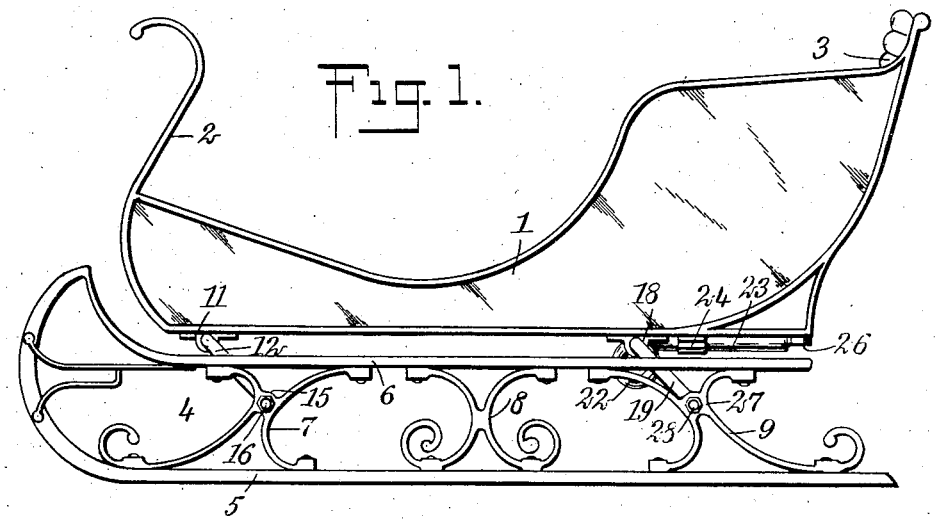
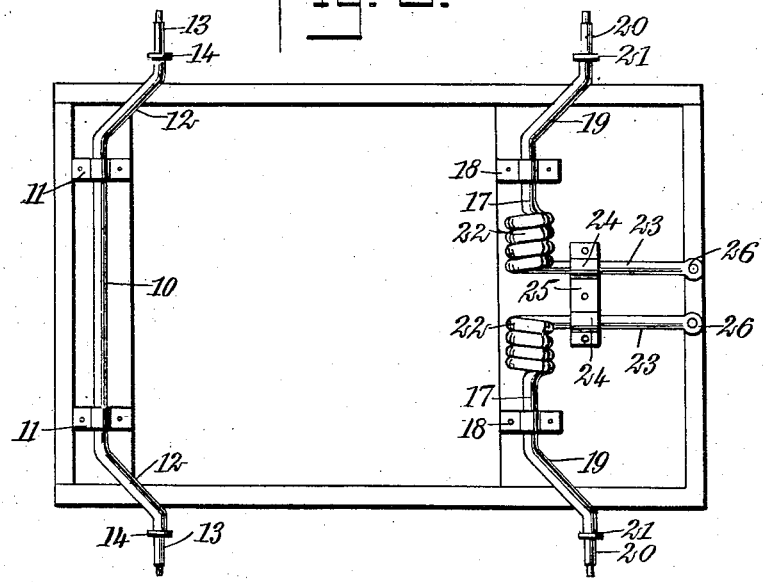
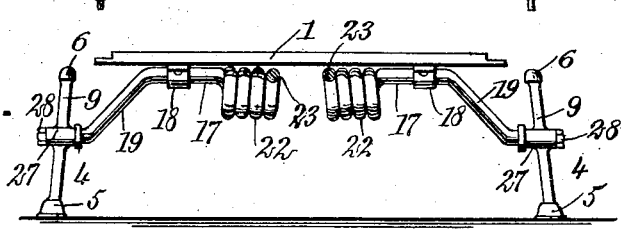
WITNESSES
Ben Joffi
John K. Buckwood
INVENTOR
Willie N. Snow
BY Munn & Co
ATTORNEYS

UNITED STATES PATENT OFFICE.

WILLIE N. SNOW, OF SNOWVILLE, NEW HAMPSHIRE.

VEHICLE.

No. 894,074.        Specification of Letters Patent.        Patented July 21, 1908.

Application filed June 15, 1907. Serial No. 379,169.

*To all whom it may concern:*

Be it known that I, WILLIE N. SNOW, a citizen of the United States, and a resident of Snowville, in the county of Carroll and State of New Hampshire, have invented a new and Improved Vehicle, of which the following is a full, clear, and exact description.

This invention relates to vehicles and it is useful in connection with vehicles mounted on runners for operation upon snow, ice and the like.

The object of the invention is to provide a simple, strong and efficient vehicle in which the body is resiliently mounted upon supports constituting runners, wheels and the like, and in which the body is constantly maintained parallel to the supports, regardless of the point of the body at which the load is applied.

A further object of the invention is to provide a vehicle having means for maintaining the body constantly parallel to the supports, and for resiliently holding the body in the normal position with respect to the supports.

The invention consists in the construction and combination of parts, to be more particularly described hereinafter and fully set forth in the claims.

Reference is to be had to the accompanying drawings forming a part of this specification, in which similar characters of reference indicate corresponding parts in all the figures, and in which Figure 1 is a side elevation of a vehicle showing my invention applied thereto; Fig. 2 is a bottom or plan view of a vehicle body having my invention applied thereto; and Fig. 3 is a rear elevation of the supporting members, showing parts in cross-section.

Before proceeding to a more detailed explanation of my invention, it should be understood that in certain classes of vehicles the relative position of the body with respect to the vehicle supports, depends upon the position of the load or weight carried by the vehicle body, so that if the weight is applied at one end the body will be inclined with respect to the supports, the inclination being due to the supporting of the body upon independent springs near the ends thereof. In the type of vehicles, such as sleighs, where the weight carried is normally located near one end of the body, this condition must be overcome by using springs of different strengths or in other ways, so that when the body is without an imposed load or in the normal position, it is inclined with respect to the supports, and only assumes a position substantially parallel thereto when a weight approximating a certain amount is placed thereupon. To avoid this disadvantage I provide a vehicle having means for constantly maintaining the body parallel to the supports and having resilient means for holding the body in the normal position, preferably a spring restraining the movement of the body towards or with respect to the supports.

Referring more particularly to the drawings, 1 represents the body of a sleigh having a dash-board 2 at one end and a seat 3 at the other or rear extremity. As the seat is arranged near the rear end of the sleigh the weight carried by the body of the same would thus be brought to bear at that end of the body. The body 1 is mounted upon supports 4, comprising in this case the runners 5 and the parallel, longitudinal runner members 6 joined by the runner braces 7, 8 and 9. A transverse supporting bar 10 is pivotally mounted upon the under side of the sleigh body in bearing brackets 11. The bar 10 has offset portions 12 constituting links, the extremities of the links being disposed parallel to the body 10 of the bar and having journals 13 and integral journal collars 14. The braces 7 of the supports are provided with journal bearings 15 in which the journals 13 are pivotally mounted and secured in place by means of nuts 16.

Similar link members 17 are pivotally mounted at the under side of the body near the rear end of the same, in suitable bearing brackets 18. The link members have offset portions 19 constituting links and having at the extremities, journals 20 similar to the journals 13 and also provided with journal collars 21. The opposite parts of the link members 17 are formed into integral helical springs 22 having the ends 23 laterally disposed with respect to the link members 17, and arranged in sleeves 24 of a sleeve bracket 25 carried by the under side of the body. The extremities 23 have eyes 26 formed therein, by means of which they are rigidly bolted to the body. The journals 20 are pivotally mounted in suitable journal bearings 27 formed in the runner braces 9 and are secured in place therein by means of nuts 28.

It will be understood that the links 12 and 19 being similar and parallel, constantly maintain the body 1 parallel to the supports 4. The movement of the body towards the supports is restrained by the helical springs 22, which tend to prevent the pivoting of the link 19 in the bearing 18, thereby tending to hold the body in the normal position, parallel to the supports, when no load is carried by the body. When the weight is applied to the body, regardless of the point of application, the entire body is depressed uniformly towards the supports, depending upon the weight of the load carried.

Having thus described my invention I claim as new and desire to secure by Letters Patent:

1. A vehicle, comprising a body, runners for supporting said body, and links secured to said body and journaled at said runners for maintaining said body parallel to said runners, one of said links having resilient means for holding said body in a normal position with respect to said runners.

2. A vehicle, comprising a body, runners for supporting said body, and links pivoted to said body and journaled at said runners, said links serving to maintain said body parallel to said runners, one of said links having an integral support rigidly secured to said body.

3. A vehicle, comprising a body, runners for supporting said body, and links pivoted to said body and journaled at said runners, said links serving to maintain said body parallel to said runners in all relative positions of said body and said runners, one of said links having an integral spring, said spring having an end laterally disposed and rigidly secured to said body.

4. A vehicle, comprising a body, runners for supporting said body, elongated members disposed transversely of said body and secured to the same and having ends journaled at said runners, said members having offset portions constituting links, one of said members having an integral spring and being rigid with said body at the side of said spring remote from the adjacent runner.

5. A vehicle, comprising a body, runners supporting said body, elongated members disposed transversely of said body and pivotally secured to the same, said members having the ends journaled at said runners, said members having laterally offset portions between said runners and said body and constituting links, one of said members having an integral spring and a laterally disposed arm rigidly mounted upon said body beyond said spring.

In testimony whereof I have signed my name to this specification in the presence of two subscribing witnesses.

WILLIE N. SNOW.

Witnesses:
EVERETT J. WHITE,
JOHN C. L. WOOD.